(12) United States Patent
Shimahara

(10) Patent No.: US 11,874,141 B2
(45) Date of Patent: Jan. 16, 2024

(54) RESOLVER

(71) Applicants: Shiro Shimahara, Ueda (JP); Futaba Corporation, Mobara (JP)

(72) Inventor: Shiro Shimahara, Ueda (JP)

(73) Assignees: SHIRO SHIMAHARA, Ueda (JP); FUTABA CORPORATION, Mobara (JP)

(*) Notice: Subject to any disclaimer, the term of this patent is extended or adjusted under 35 U.S.C. 154(b) by 105 days.

(21) Appl. No.: 17/602,493

(22) PCT Filed: Apr. 7, 2020

(86) PCT No.: PCT/JP2020/015661
§ 371 (c)(1),
(2) Date: Oct. 8, 2021

(87) PCT Pub. No.: WO2020/209252
PCT Pub. Date: Oct. 15, 2020

(65) Prior Publication Data
US 2022/0205813 A1    Jun. 30, 2022

(30) Foreign Application Priority Data
Apr. 12, 2019 (JP) .................................. 2019-076418

(51) Int. Cl.
*G01D 5/20* (2006.01)
*G01B 7/30* (2006.01)

(52) U.S. Cl.
CPC ................. *G01D 5/20* (2013.01); *G01B 7/30* (2013.01)

(58) Field of Classification Search
CPC ........... G01D 5/20; G01D 5/2073; G01B 7/30
See application file for complete search history.

(56) References Cited

U.S. PATENT DOCUMENTS

| 6,046,663 A * | 4/2000 | Kubomura | H01F 27/25 |
| | | | 336/213 |
| 6,181,130 B1 * | 1/2001 | Hoshi | G01R 33/05 |
| | | | 336/200 |

(Continued)

FOREIGN PATENT DOCUMENTS

| JP | 2000-292205 A | 10/2000 |
| JP | 2009-14374 A | 1/2009 |

(Continued)

OTHER PUBLICATIONS

International Search Report, issued in PCT/JP2020/015661, dated Jun. 23, 2020.

*Primary Examiner* — Akm Zakaria
(74) *Attorney, Agent, or Firm* — Birch, Stewart, Kolasch & Birch, LLP

(57) ABSTRACT

A resolver for detecting the displacement amount of a passive body is provided with an excitation winding or a detection winding. The detection is based on a detection signal outputted from the detection winding as a result of an excitation signal inputted to the excitation winding. The excitation winding and/or the detection winding are composed of a combination of one or more sheet coils having one or more bore portions. The sheet coils are arranged at prescribed intervals in the lengthwise direction of a magnetic core to which the sheet coils are attached. A plurality of coil-storing grooves formed in a direction perpendicular to the lengthwise direction are provided in the core surface of the magnetic core. The coil portions of at least two portions of the respective sheet coils are accommodated in the coil-storing grooves.

17 Claims, 12 Drawing Sheets

(56) References Cited

U.S. PATENT DOCUMENTS

| | | |
|---|---|---|
| 6,239,571 B1 | 5/2001 | Shimahara |
| 2003/0090223 A1* | 5/2003 | Nishizawa ............. H02K 24/00 |
| | | 318/268 |
| 2006/0125588 A1* | 6/2006 | Miya ..................... G01D 5/2086 |
| | | 336/120 |
| 2013/0342192 A1* | 12/2013 | Kanemitsu ............... G01B 7/30 |
| | | 324/207.17 |
| 2014/0084758 A1* | 3/2014 | Ochiai ................... H02K 24/00 |
| | | 310/68 B |
| 2017/0152894 A1 | 6/2017 | Kegeler |
| 2019/0128704 A1* | 5/2019 | Tada ...................... H02K 24/00 |

FOREIGN PATENT DOCUMENTS

| | | | |
|---|---|---|---|
| JP | 2009-174925 A | 8/2009 | |
| WO | WO-03038379 A1 * | 5/2003 | ........... D06F 39/003 |

* cited by examiner

RESOLVER

TECHNICAL FIELD

The present invention relates to a resolver, including an excitation winding and a detection winding, suitable for detecting a displacement amount such as a rotation angle of a passive body.

BACKGROUND ART

Conventionally, resolvers are known to have a two-phase excitation winding in which an excitation signal is input while being fixed at a spatial position where the phases are different by 90° in terms of electrical angle, and a detection winding in which a detection signal provided on a rotational shaft is output, wherein the rotation angle of the rotational shaft is detected from the phase difference between the excitation signal and the detection signal. In this type of resolver, when the rotation angle of the rotation shaft is Φ, one phase of the excitation winding becomes sin Φ, and the other phase becomes cos Φ. When excitation signals V·sin ωt and V·cos ωt having phases different by 90° are respectively given to the excitation winding, the detection signal output from the detection winding becomes E=V·sin ωt cos Φ+V·cos ωt sin Φ=V·sin ωt+Φ, and in order to obtain a detection signal whose phase changes in accordance with the rotation angle of the rotation shaft, the rotation angle Φ of the rotation shaft can be obtained from the phase difference between the excitation signal and the detection signal.

On the other hand, the present applicant has already proposed, in Patent Document 1, a resolver capable of realizing higher detection accuracy by using a modulation signal, and at the same time achieving smaller size, smaller weight, and lower cost. The resolver comprises an excitation winding in which an excitation signal is input and a detection winding in which a detection signal is output, and detects the displacement amount of a passive body based on a detection signal which changes in accordance with the displacement amount of the passive body provided with the excitation winding or the detection winding, wherein a modulation signal obtained by modulating a high-frequency signal by the excitation signal is input to the excitation winding, and a detection signal is obtained by demodulating the modulation signal output from the detection winding.

PRIOR ART PUBLICATIONS

Patent Publications

Patent Document 1: Japanese Unexamined Patent Application Publication No. 2000-292205

DISCLOSURE OF THE INVENTION

Problem Solved by the Invention

However, the resolver described in the above-mentioned Patent Document 1 has the following problems to be further improved from the viewpoint of miniaturization, particularly micro-miniaturization.

That is, since this type of resolver uses a coil, a necessary inductance can be secured when the size of the coil can be secured to a certain extent, but when a small resolver, particularly a micro-resolver having a diameter of approximately 5 mm, is to be realized, the inductance becomes small, and a necessary inductance cannot be secured. Therefore, it is necessary to further increase the drive frequency of the excitation current in order to compensate for this, but when the drive frequency is increased, other adverse effects occur, such as an increase in magnetic leakage flux. In addition, reducing the size of the resolver, i.e., miniaturizing and micro-miniaturizing the resolver requires removing the dead space inside the resolver as much as possible so that the resolver becomes easily affected by noise due to disturbances, or the like, causing the problem of lowering the detection accuracy.

Consequently, miniaturizing and micro-miniaturizing the resolver requires securing a certain amount of inductance. However, securing the necessary inductance is not easy, and there is a limit to achieving miniaturization of the resolver, particularly micro-miniaturization while securing sufficient detection accuracy, stability, and reliability.

It is an object of the present invention to provide a resolver that solves such problems existing in the background art.

Means for Solving the Problem

Provided is a resolver 1 for detecting the displacement amount of a passive body 4 provided with an excitation windings 2x and 2y or a detection winding 3 based on a detection signal So which inputs excitation signals Sx, Sy to excitation windings 2x and 2y and outputs from a detection winding 3. The excitation windings 2x and 2y and/or the detection winding 3 are composed of a combination of one or more sheet coils Cxa ..., Cya ..., and Co ... having one or more bore portions H. A plurality of coil-storing grooves 7, which are arranged at prescribed intervals Ld in the lengthwise direction Dm of magnetic cores 5 and 6 provided with the sheet coils Cxa ..., Cya ..., and Co ..., and are formed in the direction Ds perpendicular to the lengthwise direction Dm are provided in core surfaces 5f and 6f of the magnetic cores 5 and 6. Coil portions Cp and Cq of at least two portions of each sheet coil Cxa ..., Cya ..., and Co ... are accommodated in the coil-storing grooves 7.

In this case, according to the preferred aspect of the invention, the modulation signals Smx and Smy, in which the excitation signals Sx and Sy are amplitude-modulated by the high-frequency signal Sh and the polarity of the high-frequency signal Sh is inverted at the polarity inversion position of the excitation signals Sx and Sy, are input to the excitation windings 2x and 2y, and the modulation signal Smo output from the detection winding 3 is demodulated to obtain the detection signal So. The passive body 4 is configured as a rotating body 4r having a rotation shaft 11, and the sheet coils Cxa ..., Cya ..., and Co ..., and the magnetic cores 5 and 6 can be formed in a ring shape coaxial with the rotation shaft 11. On the other hand, the coil-storing groove 7 may be provided with a main storing groove 7m which has a broad width and is formed by being notched in the lengthwise direction Dm from the inner wall on the bottom portion 7d ... side. The sheet coils Cxa ..., Cya ..., and Co ... can be formed by making the respective coil portions 13f and 13r identical or different from each other provided on the front surface 12f and the rear surface 12r of the sheet portion 12, constituting the substrate. Further, the excitation windings 2x and 2y, and/or the detection winding 3 may be composed of a combination of two or more sheet coils Cxa ..., Cya ..., and Co ... and may be formed by making each sheet coil Cxa ..., Cya ..., and Co ... identical and/or different. On the other hand, the excitation windings 2x and 2y, and/or the detection winding 3 can be provided with a magnetic flux correction function portion Fs for correcting the magnetic flux distribution by the excitation windings 2x and 2y, and/or the detection winding 3 into a sine wave shape by the winding pattern Pw. When the magnetic flux correction function portion Fs is provided, the windings 2x and 2y, and/or the detection winding 3 may be provided by combining a plurality of different sheet coils Cxa . . . , Cya . . . , and Co . . . . Further, the excitation windings 2x and 2y, and/or the detection winding 3 may be provided with a magnetic flux correction function portion Fa for canceling unnecessary components of the magnetic flux distribution by the excitation windings 2x and 2y, and/or the detection winding 3 by combining a plurality of coil portions 13f and 13r.

Effects of the Invention

Using resolver 1 of the present invention with such a configuration can achieve the following remarkable effects.

(1) The exciting windings 2x and 2y, and/or the detection windings 3 are composed of a combination of one or more sheet coils Cxa . . . , Cya . . . , and Co . . . having one or more bore portions H . . . . A plurality of coil-storing grooves 7 arranged at prescribed intervals Ld . . . in the lengthwise direction Dm of magnetic cores 5 and 6 to which the sheet coils Cxa . . . , Cya . . . , and Co . . . and formed in the direction Ds perpendicular to the lengthwise direction Dm are provided in the core surfaces 5f and 6f of the magnetic cores 5 and 6, wherein coil portions Cp . . . and Cq . . . of at least two portions of each sheet coil Cxa . . . , Cya . . . , and Co . . . are stored in the coil-storing grooves 7 . . . , whereby, in particular, inductance can be increased when the resolver 1 is micro-miniaturized, ensuring sufficient output and detection accuracy, reducing magnetic leakage flux, and preventing the influence of noise.

(2) According to a preferred embodiment, if the excitation windings 2x and 2y are amplitude-modulated with the excitation signals Sx and Sy using the high-frequency signal Sh, the modulation signals Smx and Smy obtained by inverting the polarity of the high-frequency signal Sh at the polarity inversion position of the excitation signals Sx and Sy are input. The modulation signal Smo output from the detection winding 3 is demodulated to obtain the detection signal So. Thus, a sufficient induced voltage detection signal So can be obtained even when the number of turns of the sheet coils Cxa . . . , Cya . . . , and Co . . . is reduced. As a result, resolver 1 can be micro-miniaturized and reduced in weight and cost. Facilitating and stabilizing the signal processing after the demodulation process can improve detection accuracy.

(3) According to a preferred embodiment, if the passive body 4 is configured as a rotating body 4r having a rotation shaft 11, and the sheet coils Cxa . . . , Cya . . . , and Co . . . and the magnetic cores 5 and 6 are formed in a ring shape coaxial with the rotation shaft 11, the resolver 1 can be provided as an optimum resolver for detecting a rotation angle of a rotational displacement portion in a small device, or the like.

(4) According to the preferred embodiment, when the main storing groove 7m . . . having a broad width is provided in the coil-storing groove 7 . . . , the main storing groove 7m . . . having a notch formed in the lengthwise direction Dm from the inner wall on the bottom portion 7d . . . side, the flexible sheet coils Cxa . . . , Cya . . . , and Co . . . having a broader width can be accommodated, thereby increasing the number of turns per sheet of the sheet coils Cxa . . . , Cya . . . , and Co . . . and the inductance, and further improving the resolver performance.

(5) According to the preferred embodiment, when the sheet coils Cxa . . . , Cya . . . , and Co . . . are configured, if the respective coil portions 13f and 13r provided on the front surface 12f and the rear surface 12r of the sheet portion 12 constituting the substrate are formed to be identical or different from each other, not only the number of turns of the sheet coils Cxa . . . , Cya . . . , and Co . . . is increased, but the pattern of magnetic flux distribution can be corrected and the sheet coils Cxa . . . , Cya . . . , and Co . . . can be made multifunctional and diversified.

(6) According to the preferred embodiment, when the excitation windings 2x and 2y, and/or the detection windings 3 are formed by a combination of two or more sheet coils Cxa . . . , Cya . . . , and Co . . . , and the respective sheet coils Cxa . . . , Cya . . . , and Co . . . are formed to be the same and/or different, it is possible not only to increase the number of turns in the entirety of the excitation windings 2x and 2y, and/or the detection windings 3, but also to make the sheet coils Cxa . . . , Cya . . . , and Co . . . more multifunctional and diversified, such that the pattern of magnetic flux distribution can be corrected more precisely.

(7) According to the preferred embodiment, when the magnetic flux correction function portion Fs for correcting the magnetic flux distribution by the excitation windings 2x and 2y, and/or the detection winding 3 into a sine wave shape by the winding pattern Pw is provided in the excitation windings 2x and 2y, and/or the detection winding 3, the trapezoidal magnetic flux distribution that occurs when the sheet coils Cxa . . . , Cya . . . , and Co . . . are formed in a simple planar form can be easily corrected only by changing the winding pattern Pw, thereby facilitating the implementation and further miniaturization of the resolver 1 as a whole.

(8) According to the preferred embodiment, when the magnetic flux correction function portion Fs is provided, if the excitation windings 2x and 2y, and/or the detection winding 3 are provided by combining a plurality of different sheet coils Cxa . . . , Cya . . . , and Co . . . the trapezoidal magnetic flux distribution can be corrected while ensuring the necessary number of turns in the excitation windings 2x and 2y, and/or the detection winding 3.

(9) According to the preferred embodiment, when a plurality of coil portions 13f and 13r are combined with the excitation windings 2x and 2y, and/or the detection winding 3 to provide a magnetic flux correction function portion Fa for canceling an unnecessary component of the magnetic flux distribution by the excitation windings 2x and 2y, and/or the detection winding 3, the magnetic flux correction function portion Fa can be added to the original function, thereby contributing to further improvement in detection accuracy by reducing noise and errors.

DESCRIPTION OF REFERENCE NUMERALS

1: resolver, 2x: excitation winding, 2y: excitation winding, 3: detection winding, 4: passive body, 4r: rotating body, 5: magnetic core, 5f: core surface, 6: magnetic core, 6f: core surface, 7: coil-storing groove, 7d: bottom of coil-storing groove, 7m: main storing groove, 11: rotation shaft, 12: sheet portion, 12f: sheet surface, 12r: rear surface of sheet portion, 13f: coil portion, 13r: coil portion, Sx: excitation signal, Sy: excitation signal, So: detection signal, Sh: high-frequency signal, Smx: modulation signal, Smy: modulation signal, Smo: modulation signal, H: bore portion, Cxa: sheet coil, Cya: sheet coil, Co: sheet coil, Cp: coil portion, Cq: coil portion, Dm: lengthwise direction, Ds: perpendicular direction, Ld: prescribed interval, Pw: winding pattern, Fs: magnetic flux correction function portion, Fa: magnetic flux correction function portion

BEST MODE FOR CARRYING OUT THE INVENTION

Next, Examples 1 to 3 according to the best embodiment of the present invention will be described in detail with reference to the drawings.

First Embodiment

First, the configuration of resolver 1 according to Example 1 will be described with reference to FIGS. 1 to 8. The resolver 1 according to Example 1 is roughly divided into a resolver main body M1 composed of a magnetic system and a mechanical system shown in FIG. 7 and a signal processing unit M2 composed of an electrical system shown in FIG. 8.

Figure 7:
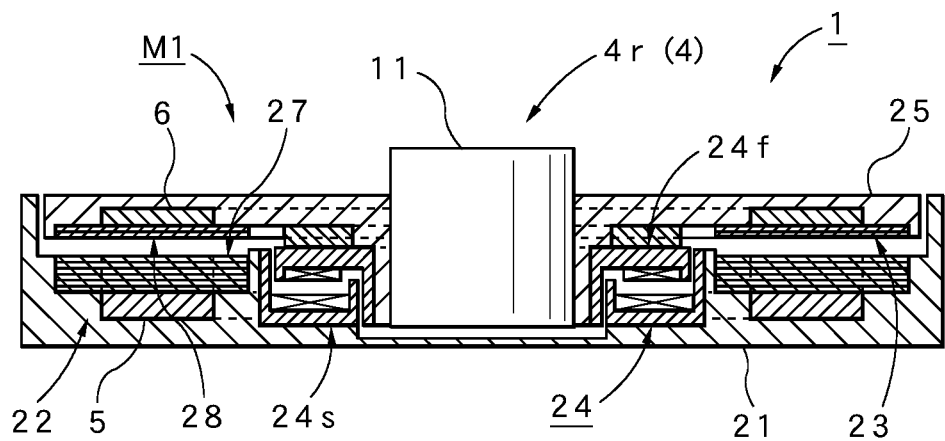
FIG. 7 is a side cross-sectional view showing the internal structure of the resolver main body of the resolver.

As shown in FIG. 7, the resolver main body M1 includes an excitation unit 22 fixedly mounted inside a casing 21 and a rotating body 4r (passive body 4) with a rotation shaft 11 rotatably supported by a bearing portion not shown at the center of the casing 21. The rotating body 4r includes a disk portion 25 in which the rotation shaft 11 is fixed at the center position, and a detection unit 23 facing the excitation unit 22 is mounted on a surface of the disk portion 25 facing the excitation unit 22. The excitation unit 22 has a ring shape as a whole. A secondary winding 24s of the output transformer 24 is disposed in the inner space thereof. The detection unit 23 also has a ring shape as a whole. A primary winding 24f of the output transformer 24 facing the secondary winding 24s is disposed in the disk portion 25 inside the detection unit 23. The above is the basic configuration of the whole resolver main body M1.

Next, the configuration of the main part of the resolver 1 according to Example 1, i.e., the configurations of the excitation unit 22 and the detection unit 23 provided in the resolver main body M1, will be specifically described with reference to FIGS. 1 to 8.

Figure 1:
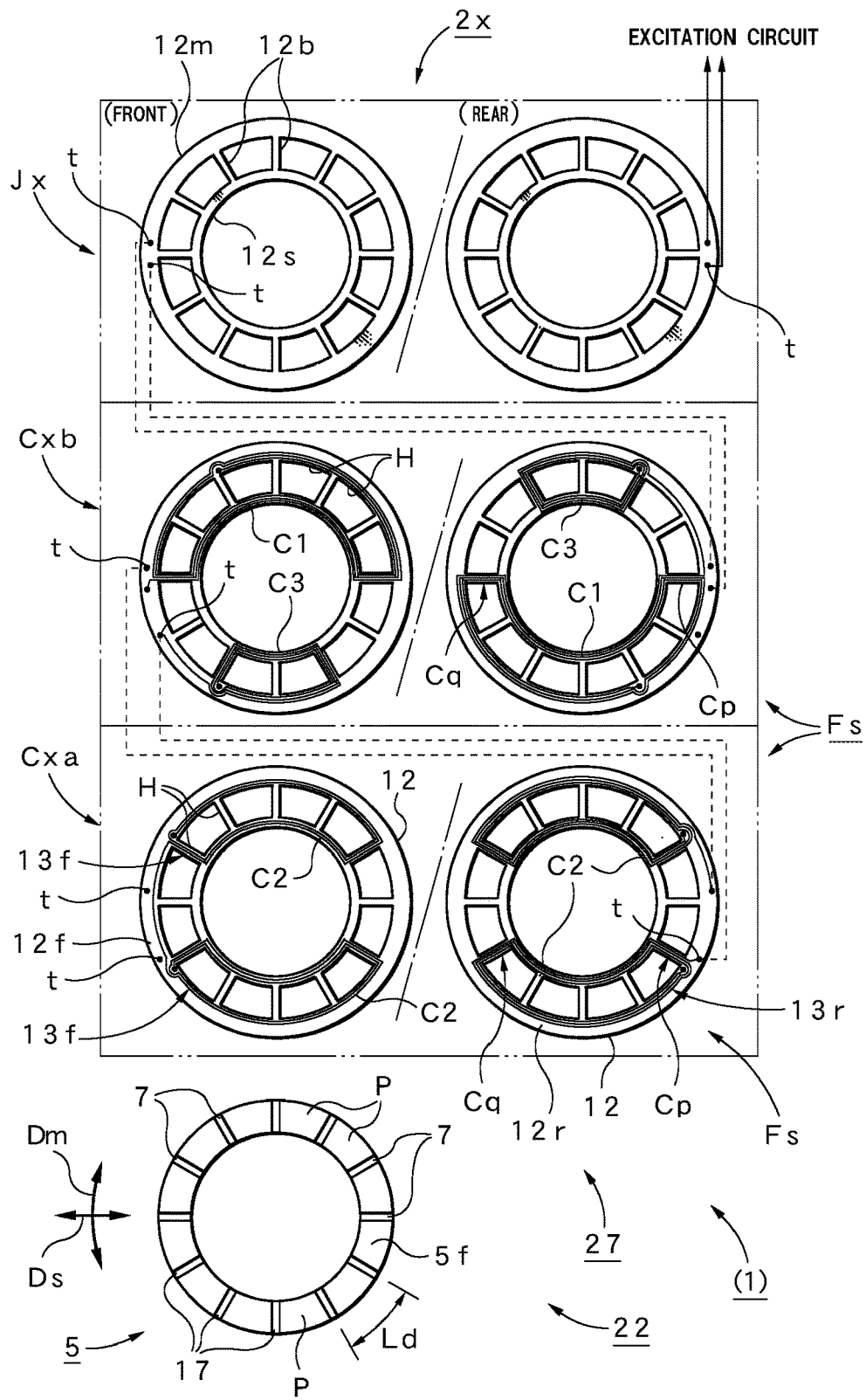
FIG. 1 is an exploded view of an excitation winding of a resolver according to the Example 1 of the present invention.
Figure 2:
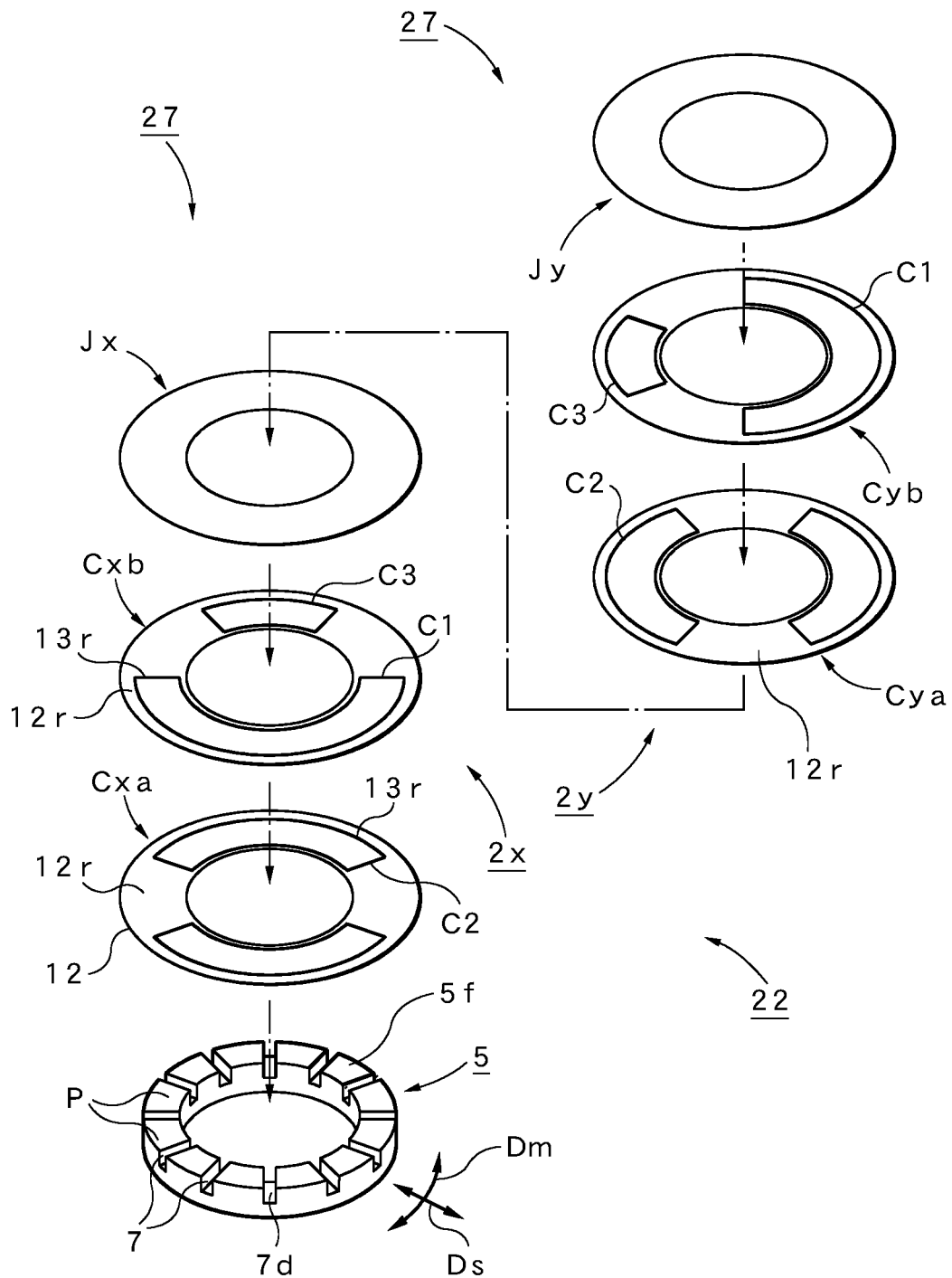
FIG. 2 is an assembly description of the excitation winding of the resolver.

As shown in FIGS. 1 and 2, the excitation unit 22 includes two sheet coil portions 27 and 27, whose phases are different from those of the magnetic core 5.

As shown in FIG. 2, the magnetic core 5 is formed into a ring shape having a prescribed thickness and integrally formed of a magnetic material such as ferrite. A plurality of coil-storing grooves 7 are arranged at prescribed intervals Ld in the lengthwise direction Dm (circumferential direction) of the magnetic core 5 and are formed in a direction Ds perpendicular (radial direction) to the lengthwise direction Dm on the core surface 5f of the magnetic core 5.

In the exemplary case, since a total of twelve coil-storing grooves 7 . . . are sequentially formed along the circumferential direction Dm, the prescribed interval Ld is an angle of 30°. The coil-storing groove 7 . . . has a function of accommodating at least two coil portions Cp . . . and Cq . . . of the sheet coils Cxa . . . and Cya . . . . Therefore, the coil-storing groove portion 7 . . . is formed to have a rectangular cross-section, and the depth is selected so that the vicinity of the center in the thickness direction is the bottom portion 7d . . . as shown in FIG. 2 (FIG. 7). Although it is desirable that the bottom portion 7d . . . is located near the center in the thickness direction, it can be arbitrarily selected according to the quantity of the sheet coils Cxa . . . and Cya . . . to be accommodated. As a result, protruding portions P . . . are formed between the coil-storing grooves 7 . . . . Resolver 1 according to Example 1 is an ultra-small resolver having a diameter of approximately 5 mm. Therefore, the diameter of the magnetic core 5 is approximately 4 mm, and the depth of the coil-storing groove 7 is approximately 0.5 mm.

Figure 8:
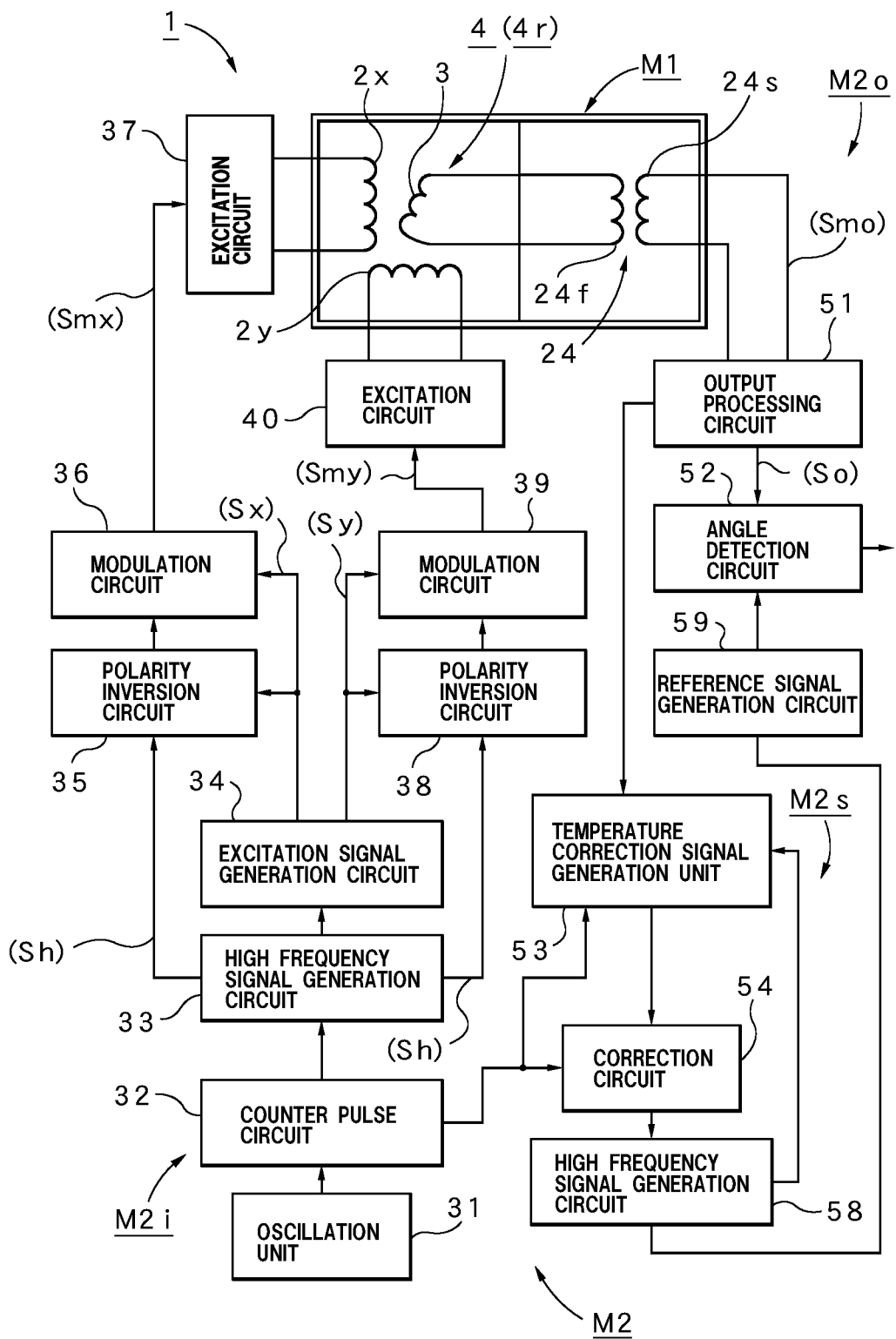
FIG. 8 is a block circuit diagram of a signal processing unit of the resolver.

On the other hand, in the case of Example 1, as shown in FIG. 8, the excitation unit 22 includes one sheet coil portion 27 having an excitation winding 2x on the sin phase side to which the modulated excitation signal Sx is applied, and another sheet coil portion 27 having an excitation winding 2y on the cos phase side to which the modulated excitation signal Sy is applied. As shown in FIG. 2, one sheet coil portion 27 comprises two sheet coils Cxa and Cxb, and the other sheet coil portion 27 is composed of two sheet coils Cya and Cyb.

A basic configuration of one sheet coil Cxa includes a sheet portion 12 constituting a substrate, and coil portions 13f and 13r provided on a front surface 12f and a rear surface 12r of the sheet portion 12, respectively, and the entire sheet coil Cxa is configured as a flexible printed circuit board FPCB. In this case, the coil portions 13f and 13r may be formed to be identical or different from each other. When the sheet coil Cxa is configured in this manner if the respective coil portions 13f and 13r provided on the front surface 12f and the rear surface 12r of the sheet portion 12 constituting the substrate are formed to be identical or different from each other, the sheet coil Cxa can be made multifunctional and diversified such as not only the number of turns of the sheet coil Cxa but also the distribution pattern of the magnetic flux distribution can be corrected. Although the sheet coil Cxa has been described, other sheet coils Cxb, Cya, and Cyb have the same basic configuration as the sheet coil Cxa. Each of the excitation windings 2x and 2y is provided with terminal sheets Jx and Jy having a lead-out function of the lead, and these terminal sheets Jx, Jy are formed in the same shape as the sheet portion 12 of each sheet coil Cxa . . . . Although the terminal sheets Jx and Jy are not provided with a coil portion, it is possible to provide a coil portion if necessary.

Hereinafter, a specific configuration of each sheet coil Cxa . . . will be described. FIG. 1 shows the winding patterns of the sheet coils Cxa, Cxb, and the terminal sheet Jx. The left side of the drawing shows the front surface 12f, and the right side shows the corresponding rear surface 12r. Each sheet coil Cxa . . . and the sheet portion 12 . . . of the terminal sheet Jx have the same shape, and as shown in FIG. 1, each of the sheet portions 12 includes a small ring portion 12s, a large ring portion 12m, and a plurality of bridge portions 12b . . . formed between the small ring portion 12s and the large ring portion 12m. In the illustrated example, 12 bridge portions 12b are provided at regular intervals. Thus, a bore portion H is formed between the bridge portions 12b, and the protruding portion P of the magnetic core 5 is inserted into the bore portion H.

Then, as shown in FIG. 1, a total of four surfaces of two front surfaces 12f and 12f and two rear surfaces 12r and 12r of the sheet portions 12 . . . of the two sheet coils Cxa and Cxb is used, and two coil portions 13f and 13f are arranged on one surface, for example, the front surface 12f to form a total of eight coil portions 13f. . . . In the example, the eight coil portions 13f. . . are formed of three kinds of coils, i.e., one of the first coil C1, the second coil C2, and the third coil C3.

First, in each sheet coil Cxa . . . , as shown in FIG. 1, the sheet coil Cxa forms the second coil C2 by using the bridge portions 12b and 12b having a positional relationship of 120 [°] on the surface 12f of the sheet portion 12 and the large ring portion 12m and the small ring portion 12s between the bridge portions 12b and 12b. At this time, as shown in FIG. 1, a pair of second coils C2 and C2 are formed by arranging them at positions of 180° symmetry, respectively, and a pair of second coils C2 and C2 are also formed on the rear surface 12r, similarly to the front surface 12f. Although the number of turns of the second coil C2 is two, this number of turns can be arbitrarily selected as a design matter.

As shown in FIG. 1, the sheet coil Cxb forms the first coil C1 by using the bridge portions 12b and 12b having a positional relationship of 180° with respect to the surface 12f of the sheet portion 12 and the large ring portion 12m and the small ring portion 12s between the bridge portions 12b and 12b. The sheet coil Cxb also forms the third coil C3 by using the bridge portions 12b and 12b having a positional relationship of 60° and the large ring portion 12m and the small ring portion 12s between the bridge portions 12b and 12b at the position of 180° symmetry with respect to the first coil C1. Further, the first coil C1 and the third coil C3 are similarly formed on the rear surface 12r, but the positions thereof are in the opposite positional relationship with respect to the front surface 12f.

Therefore, a pair of the first coils C1 and C1, the second coils C2 and C2, and the third coils C3 and C3 are provided and are connected so that one side is the S pole and the other side is the N pole. In FIG. 1, each of black dot portions t . . . of the sheet coils Cxa, Cxb, and Jx shown in FIG. 1 indicates through holes, and the sheet coil portion 27 (excitation winding 2x) is formed by laminating the sheet coils Cxa, Cxb, and Jx in this order with the surface 12f . . . of the sheet coils Cxa, Cxb, and Jx facing the magnetic core 5 side.

The excitation winding 2x has been described above. The excitation winding 2y can be configured similarly. Accordingly, two sheet coil portions 27 and 27 may be provided, one of which may be used as the excitation winding 2x and the other as the excitation winding 2y. In this case, at the time of assembling, as shown in FIG. 2, first, one sheet coil portion 27 (excitation winding 2x) is assembled to the magnetic core 5, and after that, another sheet coil portion 27 (excitation winding 2y) is assembled by spatially varying the phase of the electrical angle by 90°. FIG. 2 shows this positional relationship, and FIG. 7 shows a structure in which an excitation unit 22, including a pair of sheet coil portions 27 and 27, is assembled to a casing 21.

Figure 6:
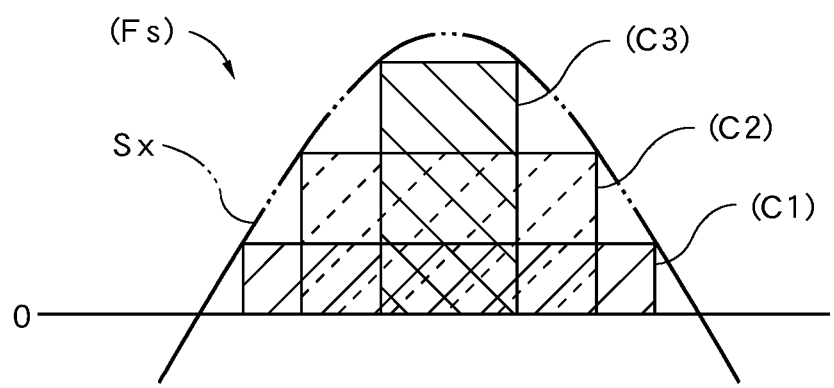
FIG. 6 is a diagram explaining the principle of the resolver.

In the excitation windings 2x and 2y, a plurality of different first coils C1 . . . , second coils C2 . . . , and third coils C3 . . . are provided and combined in order to function as a magnetic flux correction function portion Fs for correcting the magnetic flux distribution. The function of the magnetic flux correction function portion Fs will be described with reference to FIGS. 5 and 6. Ideally, the magnetic flux distribution by the excitation windings 2x and 2y is a sin curve Ux and a cos curve Uy by sinusoidal waves indicated by solid lines and dotted lines in FIG. 5, but when the sheet coils Cxa . . . and Cya . . . are formed in a simple planar form, they have a trapezoidal shape as indicated by a virtual line Uxr in FIG. 5. Therefore, as shown in FIG. 6, the magnetic flux correction function portion Fs is provided for correcting the magnetic flux distribution to a sinusoidal shape by combining the respective magnetic flux distributions of the first coil C1, the second coil C2, and the third coil C3.

When the sheet coils Cxa . . . and Cya . . . are formed in such a manner that the respective coil portions 13f and 13r provided on the front surface 12f and the rear surface 12r of the sheet portion 12 constituting the substrate are the same as or different from each other, the sheet coils Cxa . . . and Cya . . . can be made multifunctional and diversified such that not only the number of turns of the sheet coils Cxa . . . and Cya . . . increases, but also the distribution pattern of the magnetic flux distribution is corrected. That is, if the respective coil portions 13f and 13r are formed to be the same as each other, the number of turns can be increased, and if they are formed to be different from each other, the magnetic flux correction function portion Fs capable of correcting the trapezoidal magnetic flux distribution can be easily provided while ensuring the necessary number of turns in the excitation windings 2x and 2y. When the respective coil portions 13f and 13r in the excitation windings 2x and 2y are formed to be the same, and the number of turns increases, the magnetic flux correction function portion Fs may be provided on the side of the detection winding 3 to be described later.

Figure 3:
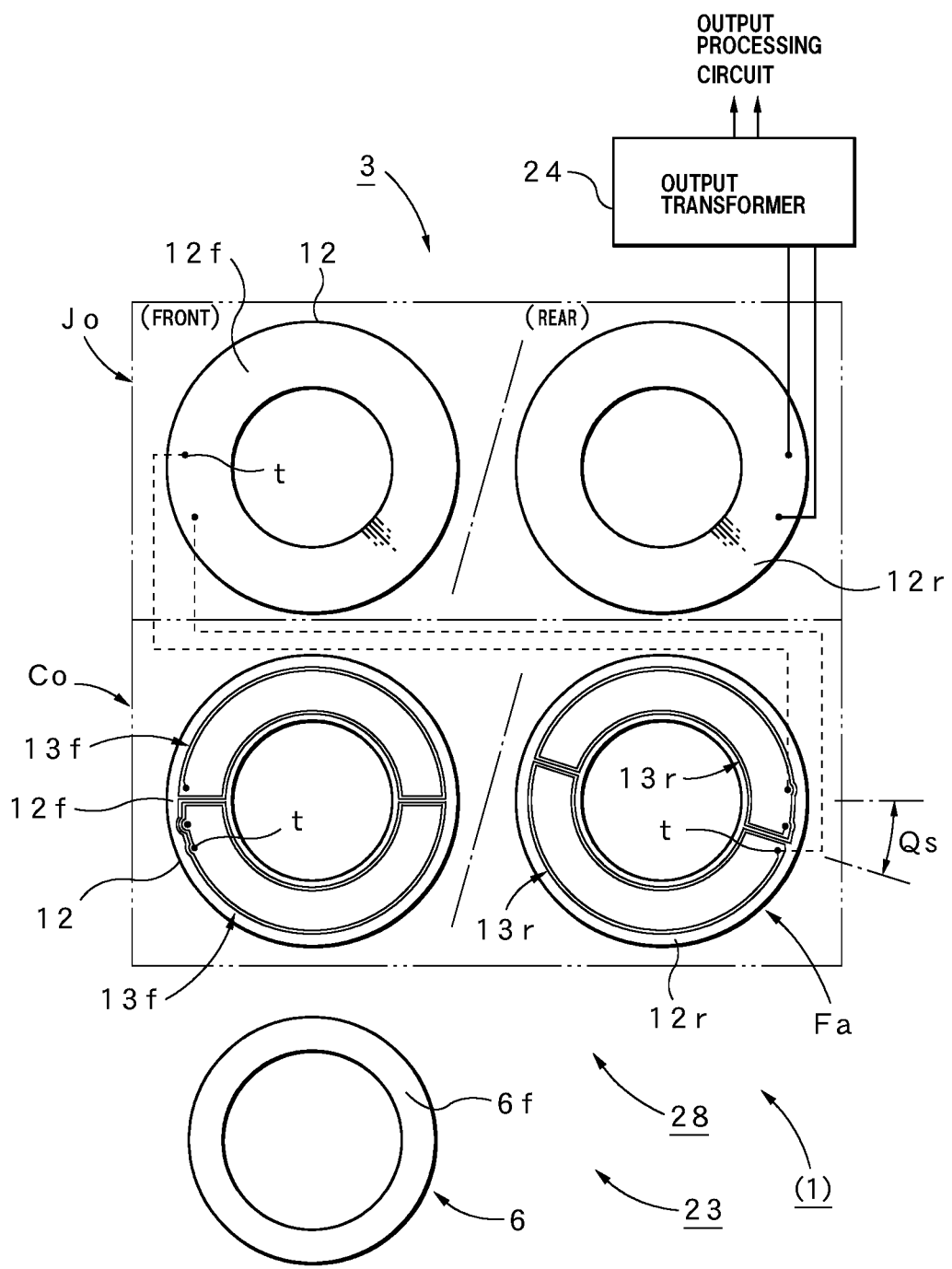
FIG. 3 is an exploded view of the detection winding of the resolver.
Figure 4:
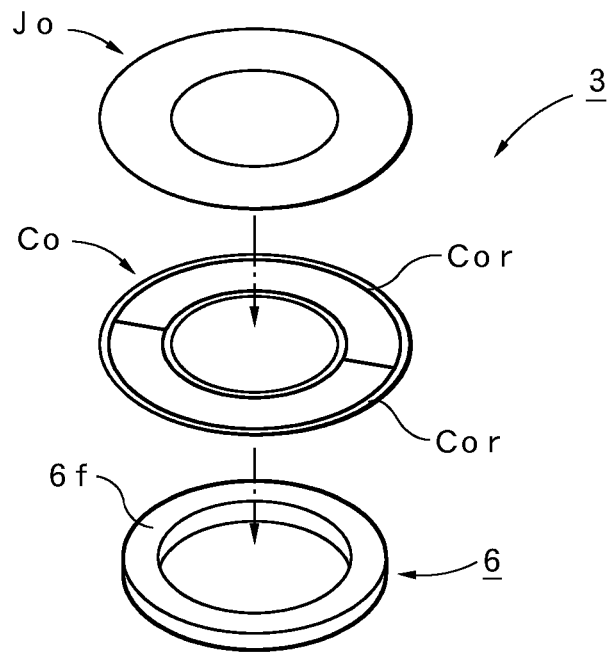
FIG. 4 is an assembly description of assembling the detection winding of the resolver.
Figure 5:
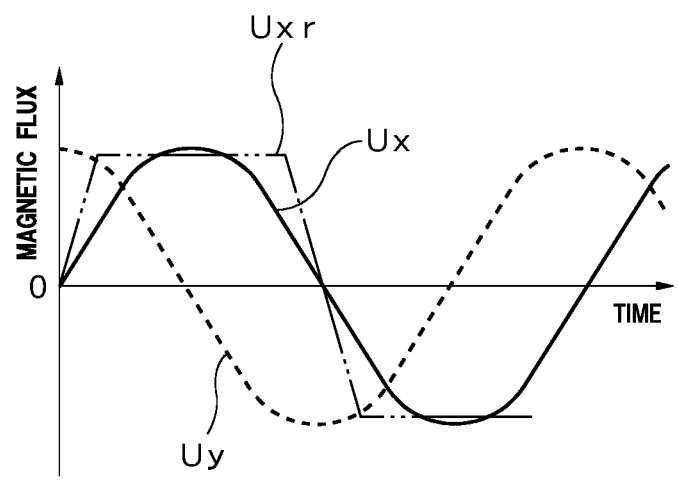
FIG. 5 is an explanatory view of a problem of the resolver.

On the other hand, as shown in FIGS. 3 and 4, the detection unit 23 comprises a magnetic core 6 and a sheet coil portion 28. As shown in FIG. 4, the magnetic core 6 is formed into a ring shape with a prescribed thickness from a magnetic material such as ferrite. In this case, the core surface 6f to which the sheet coil Co . . . to be described later is attached is formed flat, and the coil-storing grooves 7 . . . such as those on the magnetic core 5 side are not formed.

As shown in FIG. 3, in Example 1, the sheet coil portion 28 includes a detection winding 3 outputting the modulation signal Smo. As shown in FIG. 4, the detection coil 3 is composed of one sheet coil Co. A basic configuration of the sheet coil Co includes a sheet portion 12 constituting a substrate, and coil portions 13f and 13r provided on a front surface 12f and a rear surface 12r of the sheet portion 12, respectively, and the entire sheet coil Co is configured as a flexible printed circuit board FPCB. In this case, as in the case of the excitation winding 2x side, the coil portions 13f and 13r may be formed the same as or different from each other. In forming the sheet coil Co, if the respective coil portions 13f and 13r provided on the front surface 12f and the rear surface 12r of the sheet portion 12 constituting the substrate are formed to be the same or different from each other, the sheet coil Cxa can be made multifunctional and diversified such that not only the number of turns of the sheet coil Cxa is increased but also the distribution pattern of the magnetic flux distribution can be corrected. The excitation winding 3 is provided with a terminal sheet Jo having a lead-out function, and the terminal sheet Jo is formed in the same shape as the sheet portion 12 of the sheet coil Co. The terminal sheet Jo is not provided with a coil portion but may be provided with a coil portion if necessary.

FIG. 3 shows the winding pattern of the sheet coil Co and the terminal sheet Jo, with the left side of the figure showing the front surface 12f and the right side showing the corresponding rear surface 12r. The sheet portions 12 . . . of the respective sheet coils Co and the terminal sheets Jo have the same ring shape. A pair of coil portions 13f, 13f are formed on the surface 12f of the sheet portion 12 in a positional relationship of 180° symmetry. In the exemplary case, a pair of coil portions 13f and 13f are formed along an outer shape on a semicircular surface obtained by dividing the sheet portion 12 into two portions by a centerline. Although the number of turns of the illustrated coil portions 13f and 13f is two, this number of turns can be arbitrarily selected as a design matter. On the rear surface 12r of the sheet portion 12, a pair of coil portions 13r and 13r are formed in the same manner as on the front surface 12f side according to the positional relationship of 180° symmetry, but the angle in the circumferential direction Dm on the front surface 12f side is shifted from the position angle by a prescribed angle Qs so that the phases are different. This structure functions as a magnetic flux correction function portion Fa. The pair of coil portions 13f and 13f on the front surface 12f and the pair of coil portions 13r and 13r on the rear surface 12r constitute an S pole and an N pole, respectively.

The coil portions 13r and 13r of the rear surface 12r are shifted by a prescribed angle Qs for the following reasons. Usually, many harmonic components are included in the magnetic flux distribution generated by the coil portions 13f . . . and 13r . . . . These harmonic components affect the detection error. Therefore, shifting the coil portions 13f on the front surface 12f side and the rear surface 12r side of the sheet portion 12 made the sheet portion 12 function as a magnetic flux correction function portion Fa for canceling unnecessary harmonic components. In this case, selecting the magnitude of the prescribed angle Qs can select the frequency of the harmonic component to be canceled. In this manner, providing the detection winding 3 with the magnetic flux correction function portion Fa that cancels the unnecessary component of the magnetic flux distribution by the detection winding 3 by combining a plurality of coil portions 13f and 13r, the magnetic flux correction function portion Fa added to the original detection function makes an advantage that the reduction of noise and errors can contribute to further improvement of detection accuracy.

Furthermore, the black dot portions t . . . in the sheet coil Co and the terminal sheet Jo shown in FIG. 3 indicate through holes. Laminating the sheet coil Co and the terminal sheet Jo in this order with the surface 12f . . . of the sheet coil Co and the terminal sheet Jo directed toward the magnetic core 6 side can form the sheet coil portion 28 having the detection winding 3. FIG. 4 shows this positional relationship. FIG. 7 shows a structure in which the detection unit 23 formed by assembling (attaching) the sheet coil portion 28 to the magnetic core 6 is attached to the disc portion 25 and assembled to the casing 21.

Next, the configuration of the signal processing unit M2 connected to and used by the resolver main body M1 will be described with reference to FIG. 8.

In FIG. 8, M1 denotes a resolver main body and the same parts as those in FIGS. 1 to 7 are denoted by the same reference numerals to clarify the configuration thereof. A signal processing unit M2 connected to the resolver main body unit M1 is provided with an input-side circuit M2i. The input-side circuit M2i is provided with a counter pulse circuit 32 for generating a counter pulse on the basis of a clock signal generated by an oscillation unit 31, a high-frequency signal generation circuit 33 for generating a high-frequency signal having a frequency of approximately 1 MHz on the basis of the counter pulse, an excitation signal generation circuit 34 for generating an excitation signal Sx V sin ωt and Sy V·cos ωt on the basis of the high-frequency signal, a polarity inversion circuit 35 for receiving one of the excitation signals Sx and inverting the polarity of the high-frequency signal at the polarity inversion position of the excitation signal Sx and outputting the same, a modulation circuit 36 for amplitude-modulating the excitation signal Sx with the high-frequency signal output from the polarity inversion circuit 35, and an excitation circuit 37 for supplying the modulation signal Smx output from the modulation circuit 36, i.e., the excitation signal Sx that has been amplitude-modulated, to one of the excitation windings 2x, as well as a polarity inversion circuit 38 for receiving the other excitation signal Sy and inverting the polarity of the high-frequency signal at the polarity inversion position of the excitation signal Sy and outputting the same, a modulation circuit 39 for amplitude-modulating the excitation signal Sy with the high-frequency signal output from the polarity inversion circuit 38, and an excitation circuit 40 for supplying the modulation signal Smy output from the modulation circuit 39, i.e., the excitation signal Sy that has been amplitude-modulated, to the other excitation winding 2y.

M2o is an output side circuit. The output side circuit M2o includes an output processing circuit 51 connected to the secondary winding 24s of the output transformer 24 to demodulate the modulation signal Smo output from the secondary winding 24s and output the detection signal So, and an angle detection circuit 52 to which the detection signal So obtained from the output processing circuit 51 is applied. The primary winding 24f of the output transformer 24 is connected to the detection winding 3.

On the other hand, M2s is a phase correction circuit for correcting a phase error occurring between the excitation signals Sx, Sy, and the detection signal So. The phase correction circuit M2s comprises a temperature correction signal generation unit 53 for generating a correction signal based on temperature drift, a correction circuit 54 for correcting a counter pulse output from the counter pulse circuit 32 by the correction signal output from the temperature correction signal generation unit 53, a high-frequency signal generation circuit 58 for generating a high-frequency signal based on the corrected counter pulse output from the correction circuit 54, a reference signal generation circuit 59 for generating a reference signal based on the high-frequency signal output from the high-frequency signal generation circuit 58, wherein the reference signal generated by the reference signal generation circuit 59 is applied to the angle detection circuit 52. The temperature correction signal generation unit 53 has a temperature drift detection function of separating a high-frequency signal component from the modulation signal Smo obtained via the output processing circuit 51 and detecting an error component due to the temperature drift of the high-frequency signal component based on the obtained high-frequency signal component, a counter pulse output from the counter pulse circuit 32, and a high-frequency signal output from the high-frequency signal generation circuit 58, and has a correction signal generation function of generating the correction signal based on the error component obtained from the temperature drift detection function.

In this manner, when the excitation signals Sx and Sy are amplitude-modulated by the high-frequency signal Sh with respect to the excitation windings 2x and 2y, the modulation signals Smx and Smy obtained by inverting the polarity of the high-frequency signal Sh at the polarity inversion position of the excitation signals Sx and Sy are input, and the modulation signal Smo output from the detection winding 3 is demodulated to obtain the detection signal So, a sufficient induced voltage detection signal So can be obtained even when the number of turns of the sheet coils Cxa . . . , Cya . . . , and Co . . . is reduced, thereby contributing to the micro-miniaturization, weight reduction, and cost reduction of the resolver 1, and as a result, facilitating and stabilizing the signal processing after the demodulation processing makes an advantage of improving the detection accuracy.

Next, the operation of resolver 1 according to Example 1 having such a configuration will be described with reference to the respective drawings.

First, applying the clock signal output from the oscillation unit 31 shown in FIG. 8 to the counter pulse circuit 32 generates a counter pulse. The counter pulse is applied to the input side of the high-frequency signal generating circuit 33 and to the input sides of the temperature correction signal generating unit 53 and the correction circuit 54. The high-frequency signal generating circuit 33 generates a high-frequency signal having a frequency of approximately 1 [MHz] based on the counter pulse and applies the high-frequency signal to the input side of the excitation signal generation circuit 34 to generate excitation signals Sx and Sy.

One of the excitation signals Sx is applied to the modulation circuit 36 and the polarity inversion circuit 35, respectively. In modulation circuit 36, a high-frequency signal applied from the polarity inversion circuit 35 amplitude-modulates the excitation signal Sx applied from the excitation signal generation circuit 34. The resulting modulation signal Smx is applied to the excitation winding 2x via the excitation circuit 37. At this time, the polarity inversion circuit 35 inverts the polarity of the high-frequency signal for each polarity inversion position of the excitation signal Sx. Thus, the modulation signal Smx excites the excitation winding 2x, and a high-frequency current by the modulation signal Smx flows through the excitation winding 2x.

The other excitation signal Sy is applied to the modulation circuit 39 and the polarity inversion circuit 38. In modulation circuit 39, a high-frequency signal applied from the polarity inversion circuit 38 amplitude-modulates the excitation signal Sy applied from the excitation signal generation circuit 34. The resulting modulation signal Smy is applied to the excitation winding 2y via the excitation circuit 40. At this time, the polarity of the high-frequency signal given from the high-frequency signal generation circuit 33 by the polarity inversion circuit 38 is inverted for each polarity inversion position of the excitation signal Sy. Thus, the modulation signal Smy excites the excitation winding 2y, and a high-frequency current by the modulation signal Smy flows through the excitation winding 2y.

On the other hand, a voltage induced based on the excitation signal Sx and a voltage induced based on the excitation signal Sy are added in the detection winding 3, the added combined voltage is output as a modulation signal Smo, and a high-frequency current based on the modulation signal Smo flows. The modulation signal Smo is applied to the output processing circuit 51, and the modulation signal Smo is demodulated. Thus, the detection signal So is obtained and applied to the angle detection circuit 52. In the output processing circuit 51, a high-frequency signal component is separated from the modulation signal Smo. The separated high-frequency signal component is applied to a temperature correction signal generation unit 53 with a temperature drift detection function. Thus, the temperature correction signal generation unit 53 detects an error component due to the temperature drift of the high-frequency signal component based on the high-frequency signal obtained from the high-frequency signal component separated by the high-frequency signal separation function, the counter pulse obtained from the counter pulse circuit 32, and a high-frequency signal obtained from the high-frequency signal generation circuit 58. A correction signal is generated based on the error component, and the correction signal is applied to the correction circuit 54. Then, correction circuit 54 corrects the counter pulse applied from the counter pulse circuit 32 by the correction signal. That is, the error component due to temperature drift is eliminated.

On the other hand, the corrected counter pulse obtained from the correction circuit 54 is applied to the high-frequency signal generation circuit 58, and a high-frequency signal is generated based on the counter pulse. The high-frequency signal obtained from the high-frequency signal generation circuit 58 is applied to the temperature correction signal generation unit 53. The reference signal generation function of the temperature correction signal generation unit 53 generates a reference signal based on the high-frequency signal. The reference signal is applied to the angle detection circuit 52, generating a reference pulse from the reference signal and a detection pulse from the detection signal So. Then, the counter pulse is counted between the rise of the reference pulse and the rise of the detection pulse, and the count value is converted into an angle to obtain the rotation angle of the rotation shaft 11. Specifically, the relationship between the count value and the rotation angle may be stored in a database in advance, and the rotation angle corresponding to the count value may be read out from the database or may be obtained by calculation using a function expression set in advance.

Thus, the basic configuration of resolver 1 according to Example 1 includes at least the excitation windings 2x and 2y comprising a combination of two or more sheet coils Cxa . . . and Cya . . . having two or more bore portions H . . . , a plurality of coil-storing grooves 7 . . . are arranged at prescribed intervals Ld. in the lengthwise direction Dm of the magnetic core 5 to which the sheet coils Cxa . . . and Cya. are attached, and formed in the direction Ds perpendicular to the lengthwise direction Dm in the core surface 5$f$ of the magnetic core 5, and the coil portions Cp . . . and Cq . . . of at least two portions of each sheet coil Cxa . . . and Cya . . . are accommodated in the coil-storing grooves 7, so that the inductance can be increased when the resolver 1 is micro-miniaturized, sufficient output and detection accuracy can be ensured, and magnetic leakage flux can be reduced, and the influence of noise can be prevented.

Further, if the passive body 4 is configured as a rotating body 4$r$ having a rotation shaft 11, and the sheet coils Cxa . . . and Cya . . . and the magnetic core 5 are formed in a ring shape coaxial with the rotation shaft 11, it is possible to provide a modulated wave resolver 1 that is optimal for angle detection of a rotational displacement portion in an ultra-small device.

Second Embodiment

Figure 9:
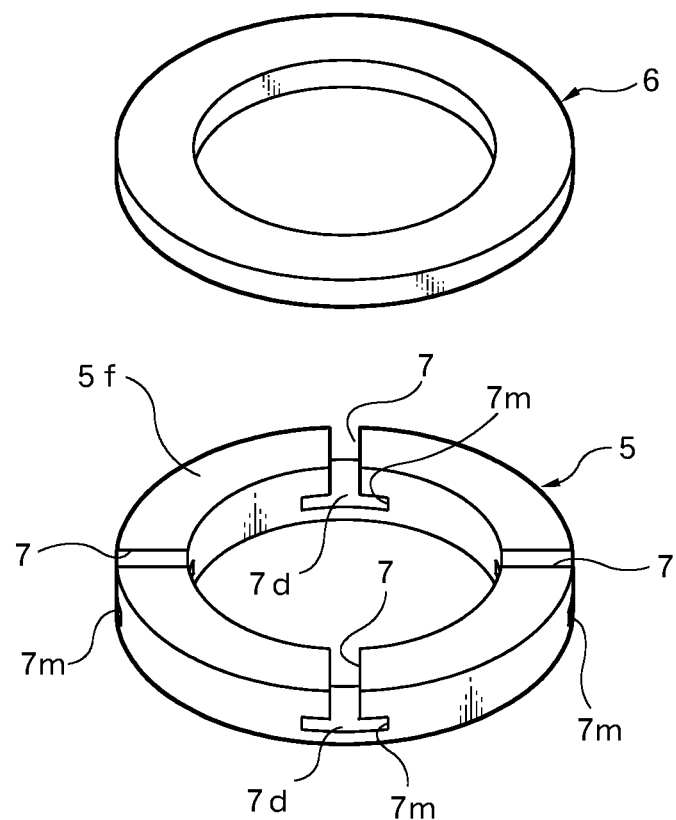
FIG. 9 is an external perspective view of the magnetic cores on the excitation side and the detection side used in the resolver according to the Example 2 of the present invention.

Next, resolver 1 according to Example 2 of the present invention will be described with reference to FIGS. 9 to 13. Example 2 differs from Example 1 shown in FIGS. 1 to 7 by first changing the configuration of the magnetic core 5 in the excitation windings 2$x$ and 2$y$. That is, as shown in FIG. 9, when forming the coil-storing groove 7 . . . a main storing groove 7$m$ . . . which has a broad width and is formed by a notch in the lengthwise direction Dm from the inner wall on the bottom portion 7$d$ . . . side is provided. Therefore, as shown in FIG. 9, the coil-storing groove 7 including the main storing groove 7$m$ has an inverted T shape when viewed in the radial direction Ds. When the coil-storing groove 7 is constructed in this manner, the flexible sheet coils Cxa and Cya having a broader width can be accommodated so that the number of turns per sheet of the sheet coils Cxa and Cya can be increased, the inductance can be further increased, and the resolver performance can be further improved.

Figure 11:
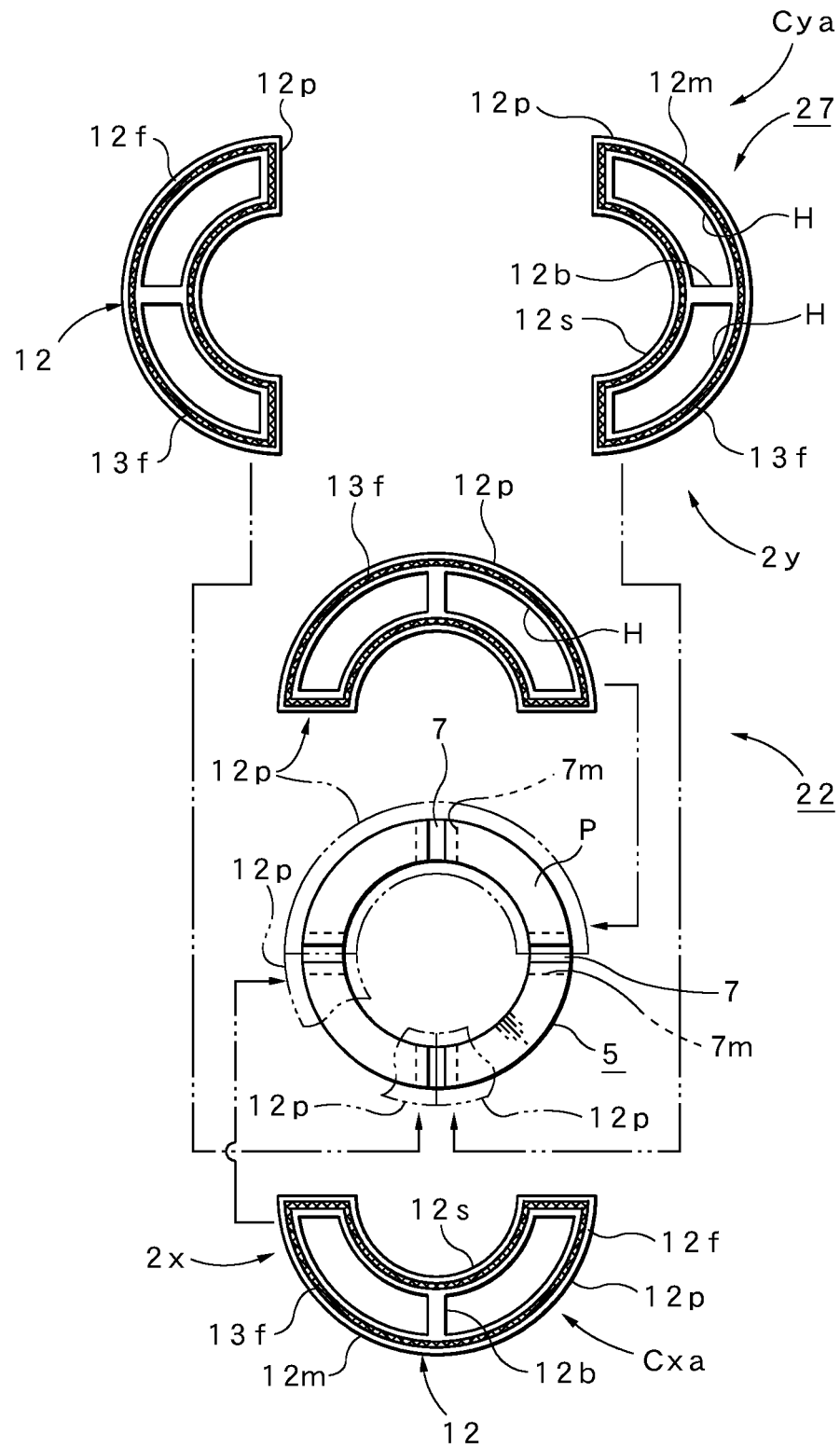
FIG. 11 is an assembly description of excitation windings of the resolver.
Figure 12:
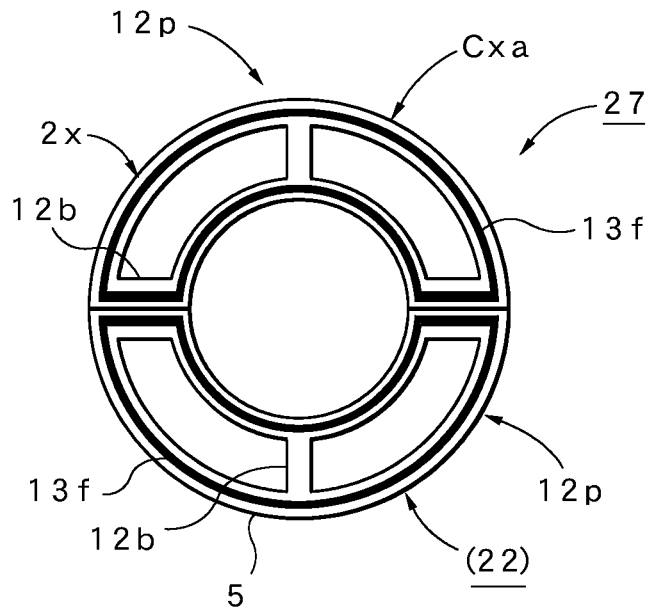
FIG. 12 is a winding pattern diagram of the excitation winding of the resolver.

As shown in FIGS. 11 and 12, one sheet coil Cxa is used for each of the excitation windings 2$x$ and 2$y$. In Example 2, since the broader flexible sheet coils Cxa and Cya can be used, the number of turns can be increased even for one sheet coil Cxa. The number of sheet coils Cxa can be used (laminated) can be reduced accordingly. In the example, as shown in FIG. 11, a half-sheet portion 12$p$ formed by dividing a ring-shaped sheet portion 12 into two is used. A coil portion 13$f$ along the outer edge portion is formed on the front surface 12$f$ of the half-sheet portion 12$p$. A coil portion 13$r$ (not shown) along the outer edge portion is formed on the rear surface of the half-sheet portion 12$p$. The two bore portions H . . . provide a total of three bridge portions 12$b$ at both end positions and central positions of the half-sheet portion 12$p$. Then, four half-sheet portions 12$p$ . . . prepared, and the two half-sheet portions 12$p$ . . . combined in a circular shape are used as the excitation winding 2$x$ as shown in FIG. 12. The other two half-sheet portions 12$p$ . . . combined in a circular shape, are used as the excitation winding 2$y$.

Although the detailed configuration of the excitation windings 2$x$ and 2$y$ shown in Example 2 is omitted, the basic configuration can be formed similarly to Example 1 shown in FIGS. 1 to 7. Although the two half-sheet portions 12$p$ are assembled while in contact, they may be combined by partially overlapping them. In this case, providing a through-hole at the overlapped portion enables connecting the respective two coil portions 13$f$ . . . and 13$r$ . . . of the two half-sheet portions 12$p$ and 12$p$. The excitation windings 2$x$ and 2$y$ in Example 2, as described above, generate a trapezoidal magnetic flux distribution, but the excitation windings 2$x$ and 2$y$ do not include the above-described magnetic flux correction function portion Fs. Therefore, the magnetic flux correction function portion Fs is provided in the detection winding 3 described later.

Figure 13:
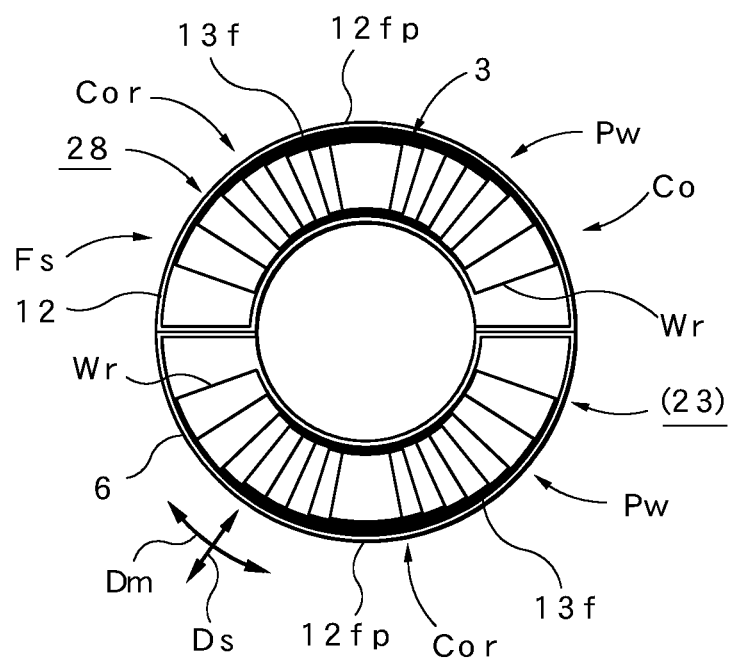
FIG. 13 is a winding pattern diagram of the detection winding of the resolver.

On the other hand, as shown in FIG. 13, the detection winding 3 uses one sheet coil Co. The sheet coil Co formed a pair of coil portions Cor on the two surfaces 12$fp$ of two areas formed by dividing the ring-shaped sheet portion 12 into two. In this case, one of the coil portions Cor forms the wire portions Wr . . . along the radial direction Ds in the circumferential direction Dm to have a gradually narrower interval up to the position advanced by 90°, and then forms the winding pattern Pw formed in the circumferential direction Dm to have a gradually wider interval up to the position advanced by 180° at positions of 180° symmetry. Therefore, the winding pattern Pw is formed in a single-stroke drawing. The same winding pattern Pw is also formed on the rear surface. The winding pattern Pw provides a waveform correction function unit Fs for correcting the magnetic flux distribution into a sine wave shape.

Thus, if the detection winding 3 is provided with the magnetic flux correction function portion Fs for correcting the magnetic flux distribution into a sine wave shape by the winding pattern Pw, the trapezoidal shape of the magnetic flux distribution which occurs when the sheet coil Co . . . is formed in a simple planar form can be easily corrected only by changing the winding pattern Pw, thereby contributing to the ease of implementation and further miniaturization of the resolver 1 as a whole.

Figure 10:
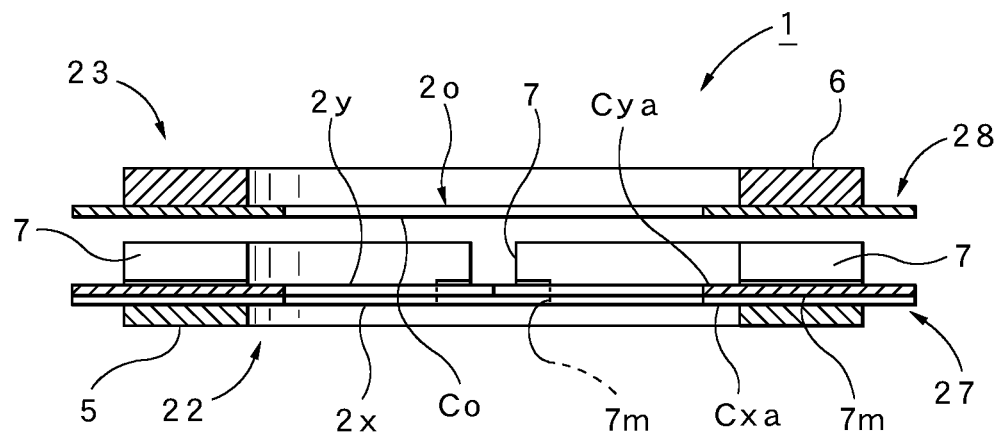
FIG. 10 is a side cross-sectional view of the excitation winding and the detection winding of the resolver.

FIG. 10 is a side cross-sectional view showing an excitation unit 22 having excitation windings 2$x$ and 2$y$ and a detection unit 23 having a detection winding 3 in the resolver 1 constructed according to Example 2. In addition, in FIGS. 9 to 13, the same parts as those in FIGS. 1 to 7 are denoted by the same reference symbols to clarify the configuration, and a detailed description thereof is omitted.

Third Embodiment

Next, resolver 1 according to Example 3 of the present invention will be described with reference to FIGS. 14 to 19. Example 3 differs from Example 2 shown in FIGS. 9 to 13 in that the sheet coils Cxa . . . , Cya . . . , and Co . . . are arranged at the end surface positions of the magnetic cores 5 and 6 formed in a ring shape (a flattened cylindrical shape), whereas in Example 3, the sheet coils Cxa . . . , Cya . . . , and Co . . . are arranged at the peripheral surface positions of the magnetic cores 5 and 6 formed in a ring shape (a flattened cylindrical shape).

Figure 14:
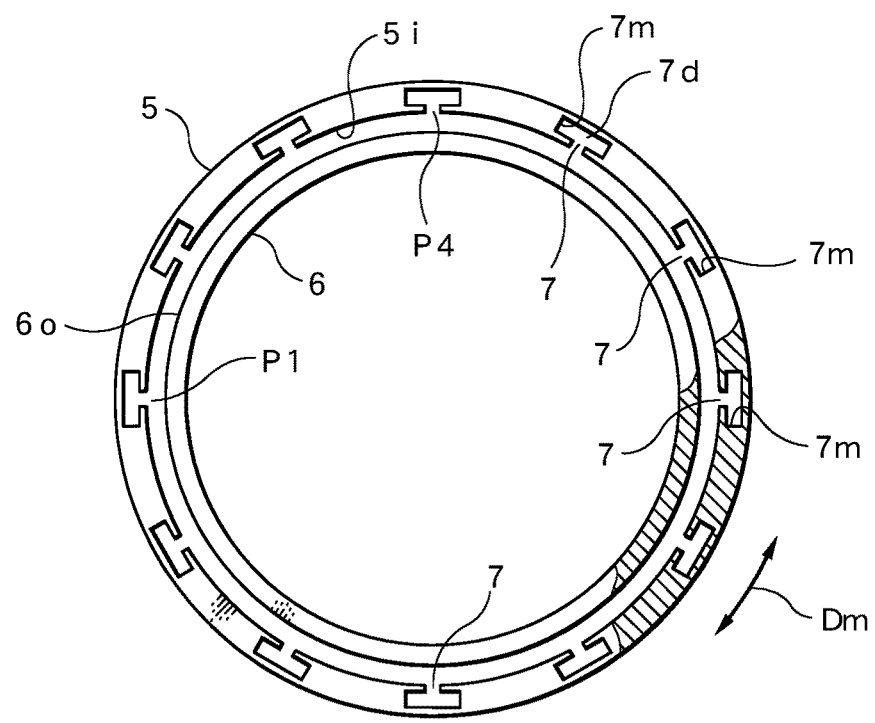
FIG. 14 is an external front view showing the appearance of magnetic cores on the excitation side and the detection side used in the resolver according to the Example 3 of the present invention.
Figure 15:
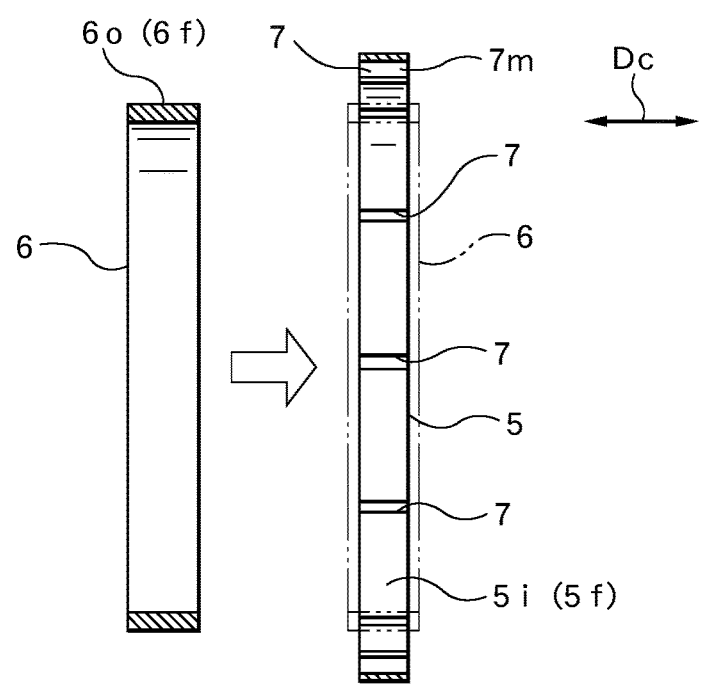
FIG. 15 is a side cross-sectional view of a magnetic core used in the resolver.

Therefore, as shown in FIGS. 14 and 15, the magnetic core 5 on the excitation side is formed by twelve coil-storing grooves 7 at equal spacing on the inner peripheral surface 5$i$, and a main storing groove 7$m$ . . . having a broad width, which is formed by a notch in the circumferential direction Dm from the inner wall on the bottom 7$d$ . . . side of the coil-storing groove 7, as shown in FIGS. 14 and 15. Therefore, as shown in FIG. 14, the coil-storing groove 7, including the main storing groove 7$m$, has a T-shape as viewed from the axial parallel direction Dc, and the basic shape is the same as that of Example 2, but the surface to be formed is different. On the other hand, as shown in FIGS. 14 and 15, the magnetic core 6 on the detection side is disposed of in a space inside the magnetic core 5. The outer peripheral surface 6$o$ (core surface 6$f$) of the magnetic core 6 faces the inner peripheral surface 5*i* (core surface 5*f*) of the magnetic core 5 through a prescribed gap.

Figure 17:
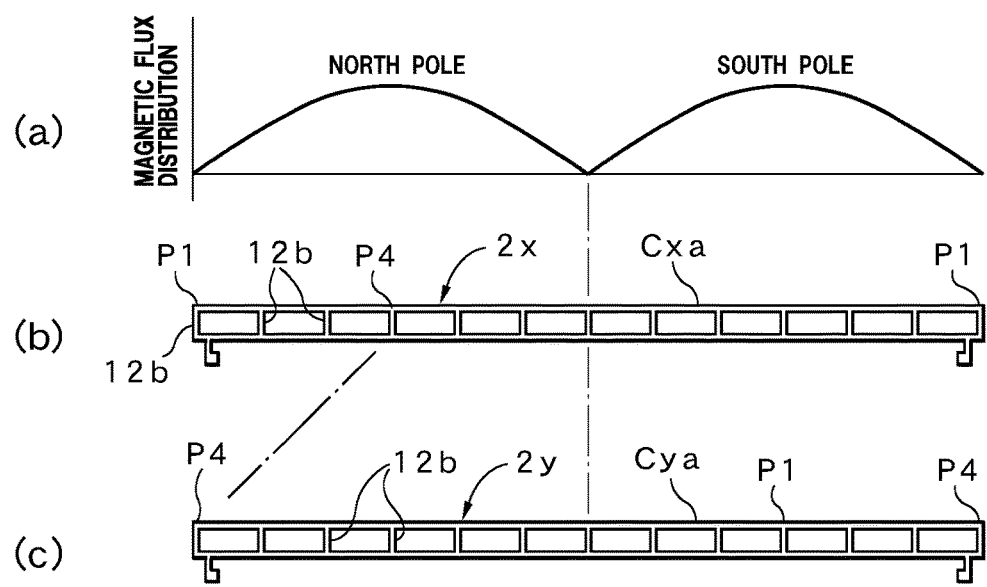
FIG. 17 is a diagram showing an overall shape of a sheet coil of the excitation winding of the resolver.

FIG. 17 shows sheet coils Cxa and Cya used for the magnetic core 5. FIG. 17*b* shows a sheet coil Cxa having an excitation winding 2*x* on the sine phase side and FIG. 17*c* shows a sheet coil Cya having an excitation winding 2*y* on the cosine phase side. The winding pattern of each sheet coil Cxa and Cya is basically selected to be the same as that of the excitation windings 2*x* and 2*y* in Example 1 as a whole. This makes it possible to obtain the magnetic flux distribution shown in FIG. 7*a*, which approximates to a sine wave. The winding patterns of each of the sheet coils Cxa and Cya are formed on the front and rear surfaces.

When the sheet coils Cxa and Cyb are assembled to the magnetic core 5, first, the bridge portion 12*b* located at the end portion P1 of the sheet coil Cxa shown in FIG. 17*b* is accommodated in the coil-storing groove 7 at the position P1 of the magnetic core 5 shown in FIG. 14, and then the bridge portion 12*b* . . . of the sheet coil Cxa is sequentially accommodated in the coil-storing groove 7 . . . along the clockwise direction in FIG. 14 on the inner peripheral surface 5*i* of the magnetic core 5. Then, the bridge portion 12*b* located at the end portion P4 of the sheet coil Cya shown in FIG. 17*c* is accommodated in the coil-storing groove 7 at the position P4 of the magnetic core 5 shown in FIG. 14, and thereafter, the bridge portion 12*b* . . . of the sheet coil Cya is accommodated in the coil-storing groove 7 . . . along the clockwise direction in FIG. 14 in the inner peripheral surface 5*i* of the magnetic core 5 so that the bridge portion 12*b* can be assembled. As a result, the sheet coils Cxa and Cya are arranged at spatial positions where the phases are different by 90° in electrical angle. Thus, the excitation unit 61 shown in FIG. 16 can be obtained. The excitation unit 61 has the same function as excitation unit 22 in Example 1.

Figure 16:
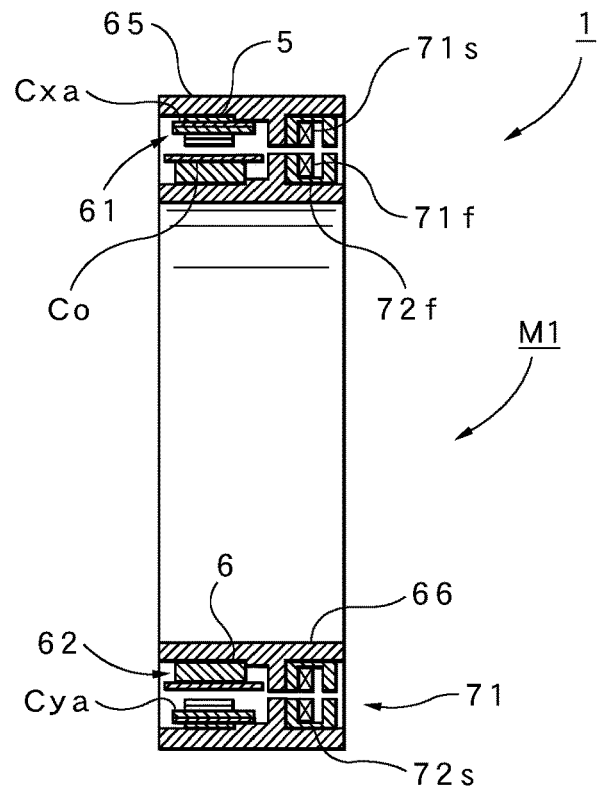
FIG. 16 is a side cross-sectional view showing an internal structure of a resolver main body of the resolver.

Further, by attaching a linear-shaped sheet coil Co formed in the same manner as the circular-shaped sheet coil Co having the detection winding 3 shown in FIG. 3 in Example 1 to the outer peripheral surface 6*o* of the magnetic core 6, the detection unit 62 shown in FIG. 16 can be obtained. This detection unit 62 has the same function as detection unit 23 in Example 1. The winding pattern of the sheet coil Co having the detection winding 3 is formed on the front surface and the rear surface.

FIG. 16 shows the resolver main body M1. In the illustrated resolver main body M1, the entire casing and the rotation shaft supported by the casing are excluded, and only the basic configuration of the resolver main body M1 is shown. In FIG. 2, reference numeral 65 denotes an outer base portion which is formed into a large diameter cylindrical shape and disposed on the outside as a fixed side, and reference numeral 66 denotes an inner base portion which is formed into a small diameter cylindrical shape and disposed on the inside as the rotating side. The outer peripheral surface of the magnetic core 5 provided in the excitation unit 61 is fixed closer to one end side of the inner peripheral surface of the outer base section 65, and the inner peripheral surface of the magnetic core 6 provided in the detection unit 62 is fixed closer to one end side of the outer peripheral surface of the inner base section 66. Further, the output transformer 71 is formed by fixing the primary core 72*f* of the primary winding 71*f* closer to the other end side of the outer peripheral surface of the inner base portion 66 and fixing the secondary core 72*s* of the secondary winding 71*s* closer to the other end side of the inner peripheral surface of the outer base portion 65.

Figure 18:
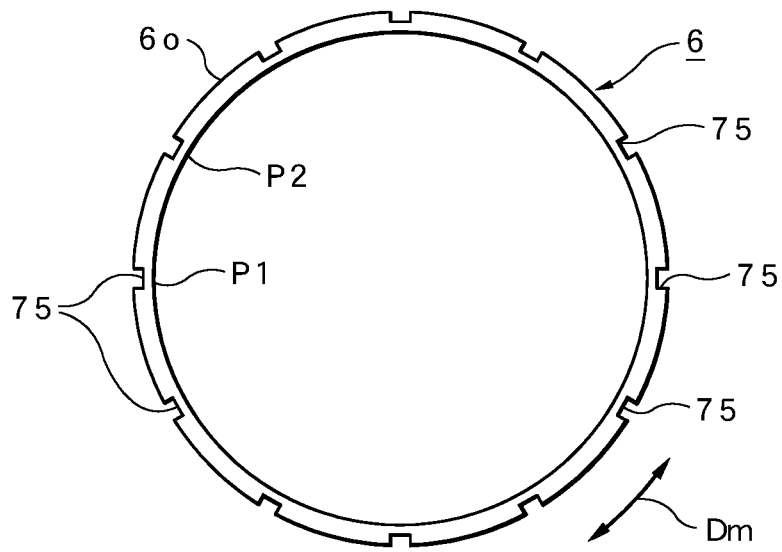
FIG. 18 is an external front view showing the appearance of the magnetic core on the detection side according to the modification example used in the resolver.
Figure 19:
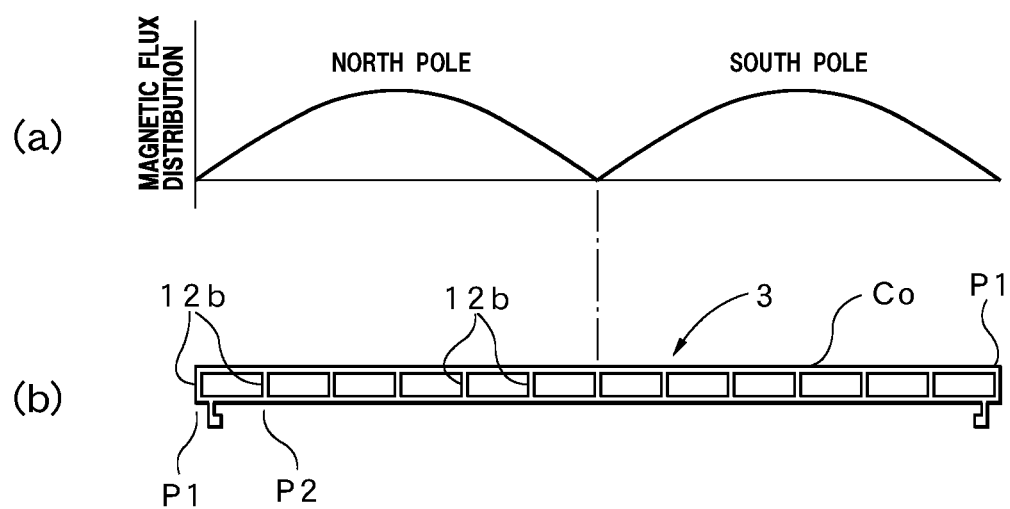
FIG. 19 is an overall shape diagram of a sheet coil of a detection winding used in the magnetic core.

FIG. 18 shows an example of a modification of the magnetic core 6 shown in FIG. 14. The magnetic core 6 shown in FIG. 18 comprises twelve coil storing recesses 75 on the outer peripheral surface 6*o* at equal spacing along the circumferential direction Dm. Therefore, in this modified example, the sheet coil Co shown in FIG. 19*b* having the same shape as the sheet coil Cxa shown in FIG. 17 can be used as the detection winding 3. The winding pattern of the sheet coil Co may be a linear-shaped sheet coil Co formed in the same manner as the circular-shaped sheet coil Co having the detection winding 3 shown in FIG. 3 in Example 1. This configuration makes it possible to obtain a detection unit having the same function as the detection unit 62 shown in FIG. 16. Also in this case, the winding pattern of the sheet coil Co is formed on the front surface and the rear surface. FIG. 19*a* shows a magnetic flux distribution that approximates a sine wave obtained on the detection winding 3 side. In addition, in FIGS. 14 to 19, the same parts as those in FIGS. 1 to 13 are denoted by the same reference symbols to clarify the configuration, and a detailed description thereof is omitted.

The preferred embodiments (Examples 1 to 3) have been described in detail above. The present invention is not limited to such embodiments (examples), and may be arbitrarily changed, added, or deleted in terms of details such as configuration, shape, material, quantity, numerical value without departing from the scope of the present invention.

For instance, the examples have shown that modulation signals Smx and Smy are inputted to the excitation windings 2*x* and 2*y*, wherein the modulation signals Smx and Smy are obtained by amplitude-modulating the excitation signals Sx and Sy by the high-frequency signal Sh and inverting the polarity of the high-frequency signal Sh at the polarity inversion position of the excitation signals Sx and Sy, and the modulation signal Smo outputted from the detection winding 3 is demodulated to obtain the detection signal So. However, the case is not excluded where the excitation signals Sx and Sy are inputted to the excitation windings 2*x* and 2*y* without modulation and the displacement amount of the passive body 4 is detected, wherein the passive body is equipped with excitation windings 2*x* and 2*y* or the detection winding 3, based on the detection signal So outputted from the detection winding 3. Further, a case has been shown in which the passive body 4 is configured as a rotating body 4*r* having a rotation shaft 11, and the sheet coils Cxa . . . , Cya . . . , and Co . . . and magnetic cores 5 and 6 are formed in a ring shape coaxial with the rotation shaft 11, and a so-called rotary type has been described. However, the passive body 4 may be configured as a so-called linear type in which the passive body 4 is displaced in a straight traveling direction. On the other hand, the examples have shown that the excitation windings 2*x* and 2*y* are constituted by a combination of one or more sheet coils Cxa . . . and Cya . . . having one or more bore portions H . . . . However, the detection winding 3 may be constituted by combining one or more sheet coils Co . . . having one or more bore portions H . . . . Or both the excitation windings 2*x* and 2*y* and detection winding 3 may be constituted by combining one or more sheet coils Cxa . . . , Cya . . . , and Co . . . having one or more bore portions H . . . . Similarly, the case has been described where the coil-storing grooves 7 . . . are provided in the magnetic core 5. However, they may be provided in the magnetic core 6 or magnetic cores 5 and 6. The case has been described where the sheet coils Cxa . . . , Cya . . . , and Co . . . are provided on the front surface 12*f* and the rear surface 12*r* of the sheet portion 12 constituting the substrate. However, they do not exclude cases where they are provided only on the front surface 12*f* or the rear surface 12*r*. The case has been shown where the modulation signals Smx and Smy are obtained by amplitude-modulating the excitation signals Sx and Sy. However, they do not hinder the adoption of other modulation schemes such as phase modulation.

INDUSTRIAL APPLICABILITY

The resolver according to the present invention can be used in various applications for detecting the displacement amount (rotation angle) of a passive body provided with an excitation winding or a detection winding.

The invention claimed is:

1. A resolver for detecting a displacement amount of a passive body, comprising:
an excitation winding; and
a detection winding,
wherein the detection is based on a detection signal outputted from the detection winding as a result of an excitation signal inputted to the excitation winding,
wherein at least one of the excitation winding and the detection winding is composed of a combination of one or more sheet coils having one or more bore portions,
wherein a plurality of coil-storing grooves are arranged at prescribed intervals in the lengthwise direction of a magnetic core to which the sheet coils are attached,
wherein the plurality of coil-storing grooves are formed in a direction perpendicular to the lengthwise direction in a first core surface of the magnetic core, and
wherein the excitation winding or the detection winding is accommodated in the plurality of coil-storing grooves.

2. The resolver according to claim 1, wherein a modulation signal obtained by amplitude-modulating an excitation signal with a high-frequency signal and inverting a polarity of the high-frequency signal at the polarity inversion position of the excitation signal is inputted to the excitation winding, and a modulation signal outputted from the detection winding is demodulated to obtain the detection signal.

3. The resolver according to claim 1, wherein the passive body is formed as a rotating body having a rotation shaft, and the sheet coil and the magnetic core are formed in a ring shape coaxial with the rotation shaft.

4. The resolver according to claim 1, wherein the coil-storing groove has a main storing groove portion having a broad width formed by a notch in a lengthwise direction from an inner wall on a bottom side.

5. The resolver according to claim 1, wherein the sheet coil is formed by making the respective coil portions provided on a front surface and a rear surface of a sheet portion constituting a substrate identical or different from each other.

6. The resolver according to claim 1, wherein the excitation winding and/or the detection winding are composed of a combination of two or more sheet coils, and each sheet coil is formed to be identical or different.

7. The resolver according to claim 1, wherein the excitation winding and/or the detection winding comprises a magnetic flux correction function portion for correcting a magnetic flux distribution by the excitation winding and/or the detection winding in a sinusoidal waveform by a winding pattern.

8. The resolver according to claim 1, wherein the excitation winding and/or the detection winding include a magnetic flux correction function portion for correcting a magnetic flux distribution by the excitation winding and/or the detection winding in a sinusoidal waveform by combining a plurality of different sheet coils.

9. The resolver according to claim 1, wherein the excitation winding and/or the detection winding comprises a magnetic flux correction function for canceling an unnecessary component of a magnetic flux distribution by the excitation winding and/or the detection winding by combining a plurality of the coil portions.

10. The resolver according to claim 1, wherein the plurality of coil-storing grooves are T-shaped.

11. The resolver according to claim 1, wherein the plurality of coil-storing grooves extend into a second core surface extending from the first core surface.

12. The resolver according to claim 1, wherein the magnetic core has a top surface, a bottom surface, an inner curved surface and an outer curved surface, and
wherein the first core surface is the inner curved surface.

13. The resolver according to claim 1, wherein the magnetic core has a top surface, a bottom surface, an inner curved surface and an outer curved surface, and
wherein the first core surface is the outer curved surface.

14. A resolver for detecting a displacement amount of a passive body, comprising:
an excitation winding; and
a detection winding,
wherein the detection is based on a detection signal outputted from the detection winding as a result of an excitation signal inputted to the excitation winding,
wherein the excitation winding or the detection winding is composed of at least one sheet coil,
wherein the at least one sheet coil is retained in a plurality of grooves provided in a first core surface of a magnetic core.

15. The resolver according to claim 14, wherein the plurality of grooves are T-shaped.

16. The resolver according to claim 14, wherein the at least one sheet coil is a plurality of sheet coils.

17. The resolver according to claim 14, wherein the at least one sheet coil comprises a small ring portion, a large ring portion, and a plurality of bridge portions extending between the small ring portion and large ring portion, the plurality of bridge portions respectively engaging the plurality of grooves.

* * * * *